United States Patent
Le Bordays

(10) Patent No.: US 10,544,964 B2
(45) Date of Patent: Jan. 28, 2020

(54) STIRLING COOLER WITH FLEXIBLE REGENERATOR DRIVE

(71) Applicant: Thales, Courbevoie (FR)

(72) Inventor: Julien Le Bordays, Blagnac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/555,979

(22) PCT Filed: Mar. 14, 2016

(86) PCT No.: PCT/EP2016/055448
§ 371 (c)(1),
(2) Date: Sep. 6, 2017

(87) PCT Pub. No.: WO2016/146580
PCT Pub. Date: Sep. 22, 2016

(65) Prior Publication Data
US 2018/0058730 A1   Mar. 1, 2018

(30) Foreign Application Priority Data

Mar. 13, 2015 (FR) ...................... 15 00487

(51) Int. Cl.
*F25B 9/14* (2006.01)
*F16C 7/02* (2006.01)
(Continued)

(52) U.S. Cl.
CPC .................. *F25B 9/14* (2013.01); *F16C 7/02* (2013.01); *F16J 7/00* (2013.01); *F01B 9/02* (2013.01);
(Continued)

(58) Field of Classification Search
CPC .... F25B 9/14; F02G 1/053; F01B 9/02; F04B 39/0022; F16C 7/02; F16C 7/04
(Continued)

(56) References Cited

U.S. PATENT DOCUMENTS

| 1,531,709 A | * | 3/1925 | Lundgaard | ................ F25B 9/14 62/6 |
| 4,365,982 A | | 12/1982 | Durenec | |
| 2009/0025399 A1 | * | 1/2009 | Kamen | ................ B01D 1/02 62/6 |

FOREIGN PATENT DOCUMENTS

| CN | 2700781 Y | 5/2005 |
| CN | 201992902 U | 9/2011 |

(Continued)

OTHER PUBLICATIONS

PCT Application No. PCT/EP2016/055448, International Search Report, dated May 4, 2016, 2 pages.

*Primary Examiner* — John F Pettitt, III
(74) *Attorney, Agent, or Firm* — Soquel Group LLC

(57) ABSTRACT

A cooler operating on the Stirling cycle, of the type including a compressor with a compression piston moving in a compression cylinder, a regenerator with a regeneration piston moving in a regeneration cylinder, a driving crankshaft including a crank pin that can rotate with respect to the compression cylinder and/or the regeneration cylinder, and a compression connecting rod, including a head mounted on the front pin and a foot articulated on the compression piston, the regeneration piston being connected to the crankshaft by a link element including at least three rigid adjacent sections connected by at least two spring-type connecting rods.

8 Claims, 2 Drawing Sheets

(51) Int. Cl.
 *F16J 7/00* (2006.01)
 *F01B 9/02* (2006.01)
 *F04B 39/00* (2006.01)

(52) U.S. Cl.
 CPC ..... *F04B 39/0022* (2013.01); *F25B 2309/003* (2013.01)

(58) Field of Classification Search
 USPC .................................................. 74/25; 62/6
 See application file for complete search history.

(56) References Cited

FOREIGN PATENT DOCUMENTS

| | | | | |
|---|---|---|---|---|
| CN | 102654325 | A | 9/2012 | |
| EP | 0135013 | A2 * | 3/1985 | ........... F02G 1/0535 |
| SU | 1186903 | A2 | 10/1985 | |
| SU | 1508057 | A1 | 9/1989 | |

* cited by examiner

STIRLING COOLER WITH FLEXIBLE REGENERATOR DRIVE

The present invention relates to a cooler operating according to the Stirling cycle, of the type comprising: a compressor with a movable compression piston that can move within a compression cylinder, along a first axis; a regenerator with a movable regeneration piston that can move within a regeneration cylinder, along a second axis that forms an angle with the first axis; a driving crankshaft, comprising a rotatable crank pin that can rotate relative to the compression cylinder and/or the regeneration cylinder, about a third axis that is substantially coplanar with the first axis and substantially perpendicular to the first and second axes; and a compression connecting rod, comprising a connecting rod head mounted on the crank pin of the crankshaft and a connecting rod foot that is articulated on the compression piston.

Such a cooler is in particular described in the document U.S. Pat. No. 4,365,982.

In a known manner, the Stirling cycle comprises the following four phases:
an isothermal compression of a fluid at a hot temperature, obtained by the displacement of a compression piston in a compression cylinder;
the isochoric cooling of the fluid, from a hot temperature to a cool temperature, obtained by the passing of the fluid through a regeneration piston, the said piston being in motion within a regeneration cylinder and serving the purpose of a heat exchanger;
an isothermal expansion of the fluid at the cool temperature, obtained by the return of the compression piston in the compression cylinder; and
an isochoric heating of the fluid, from the cool temperature to the hot temperature, obtained by return of the regeneration piston in the regeneration cylinder.

In a conventional manner, the regeneration piston is driven by the crankshaft, by means of a small connecting rod that is articulated on the one hand on the compression connecting rod and on the other hand on the regeneration piston.

This device needs to be installed with very small clearances in the articulations of the small connecting rod, in particular in order to reduce the shock impacts at each reversal of direction of displacement of the piston. The constraints and costs of production are thus high with respect to parts.

The objective of the present invention is to provide a device that ensures the mechanical drive of the regeneration cylinder, while reducing the constraints and costs associated therewith.

To this end, the object of the invention relates to a cooler of the aforementioned type, in which the regeneration piston is connected to the crankshaft by a link element comprising at least three adjacent rigid sections connected by at least two spring-type links, a first end of the said link element being mounted in a fixed manner on the regeneration piston, a second end of the said link element being mounted in a fixed manner on the head of the compression connecting rod.

The term "spring-type link" is used to refer to a link that is flexible and has no clearances. As will be detailed in the description following here below, links other than springs present these characteristic features.

According to other advantageous aspects of the invention, the cooler includes one or more of the following characteristic features, taken into consideration individually or in accordance with all possible technical combinations:

the first and second ends of the link element are disposed on either side of a plane formed by the first axis of the compression piston and the third axis of the crankshaft;
the second axis of the regeneration piston is located at a non-zero distance from the third axis of the crankshaft;
the third axis is disposed between the second axis and the compression cylinder;
the at least three sections are substantially rectilinear;
the at least two sections of the link element that are closest to the regeneration piston are disposed to be substantially parallel to the second axis, and at least the section that is closest to the head of the connecting rod is disposed to be substantially parallel to the first axis;
the links are formed by helical torsion springs;
the helical coil springs are disposed along axes that are parallel to one another;
the helical coil springs are disposed along axes that are perpendicular to one another.

The invention will be better understood upon reading the description which follows, provided purely by way of example and with reference being made to the drawings in which.

Figure 1:
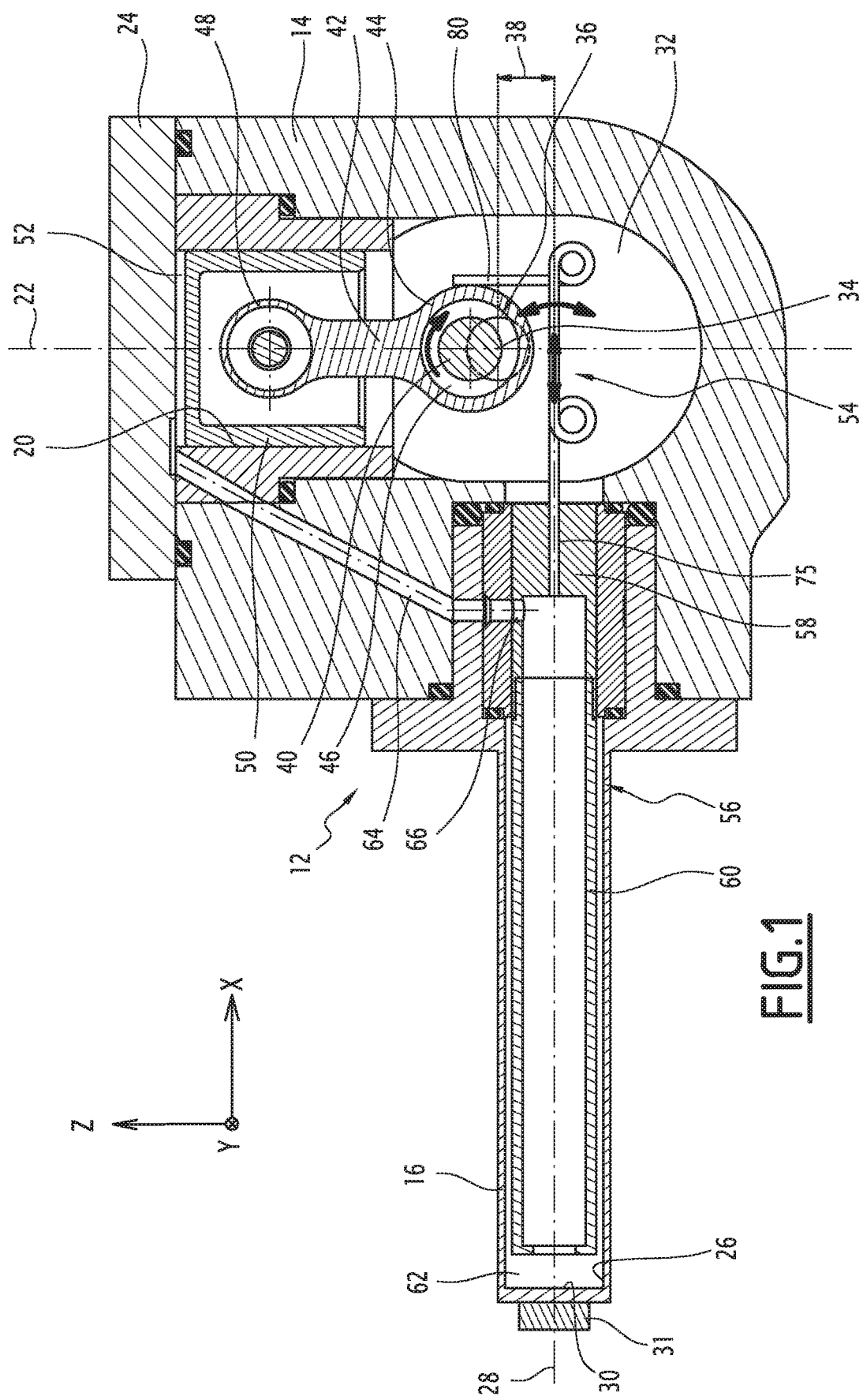
FIG. 1 is a cross-sectional view of a cooler according to one embodiment of the invention.

FIG. 1 shows a cross-sectional view of a device 10 according to a first embodiment of the invention. The device 10 is a cooler operating according to the Stirling cycle. The device 10 includes a housing 12. The said housing 12 comprises in particular a body 14 and a cryostat well 16, assembled to one another and defining an internal volume 18 within the housing. The internal volume 18 is preferably filled with a high purity gas such as helium.

In the following sections of the description, an orthonormal base (X, Y, Z) is considered.

The body 14 of the housing in particular defines a first internal wall 20, having a cylindrical form, disposed along a first axis 22 that is parallel to Z. The said internal wall 20 is referred to as the compression cylinder. The housing 12 further also includes a flange 24 assembled on to the body 14. The flange 24 closes an orifice situated at a first axial end of the compression cylinder 20.

The cryostat well 16 defines a second internal wall 26, having a cylindrical form, disposed along a second axis 28 that is inclined in relation to the first axis 22. In the example represented in FIG. 1, the second axis 28 is parallel to X, that is to say, perpendicular to the first axis 22. The second axis 28 is substantially coplanar to the first axis 22.

The second internal wall 26 is referred to as the regeneration cylinder. A first axial end 30 of the regeneration cylinder 26, referred to as the cold end, is closed. In a conventional manner, the cold end 30 is in contact with an element 31 to be cooled by means of the device 10, for example an electronic component.

The second axial ends of the compression cylinder 20 and of the regeneration cylinder 26 communicate with a central space 32 of the housing 12. The central area 32 is substantially cylindrical, disposed to be parallel to Y.

The central space 32 accommodates a crankshaft system 36, connected to a motor (not shown). The crankshaft 36 includes a motor shaft disposed along a third axis 34 that is parallel to Y. The third axis 34 is substantially coplanar to the first axis 22. Preferably, as shown in FIG. 1, the third axis 34 is disposed between the second axis 28 and the compression cylinder 20, at a non-zero distance 38 from the second axis 28.

Mounted in a fixed manner on the motor shaft of the crankshaft 36 is an eccentric crank pin 40. The crank pin 40 is coupled to a connecting rod 42 that is substantially disposed in the plane (X, Z) containing the first and second axes 22, 28.

The connecting rod 42 is a rigid piece, comprising a head 44 that is mounted on to the crank pin 40 by means of a bearing 46. The connecting rod 42 further comprises a foot 48 that is attached in an articulated manner to a first piston 50, referred to as the compression piston. The compression piston 50 is movable in translational motion along the first axis 22 within the compression cylinder 20, which guides the piston 50 during its movement.

The compression piston 50 defines a compression chamber 52, located within the compression cylinder 20 between the flange 24 and the said compression piston 50. The compression chamber 52 has a variable volume that varies based on the movement of the piston 50.

By means of a link element 54, which will be described here below, the eccentric crank pin 40 is also connected to a second piston 56, referred to as the regeneration piston. The regeneration piston 56 is movable in translational motion along the second axis 28 in the regeneration cylinder 26, which guides the piston 56 during its movement.

The regeneration piston 56 comprises a base 58 as well as a tube 60, which extends from the base 58 in the regeneration cylinder 26, in the direction towards the cold end 30. Typically, the interior of the tube 60 is packed with a porous material (not shown) that is capable of heat exchange with a fluid contained in the regeneration cylinder 26. The porous material is for example formed by a stack of metal meshes.

The regeneration piston 56 defines a regeneration chamber 62, located within the regeneration cylinder 26 between the cold end 30 and the said regeneration piston 56. The regeneration chamber 62 has a variable volume that varies based on the movement of the piston 56.

A pneumatic connection between the compression chamber 52 and the regeneration chamber 62 is ensured for example by a conduit of which a first part 64 passes through the housing 12 and a second part 66 passes through the base 58 of the regeneration piston 56.

Figure 2:
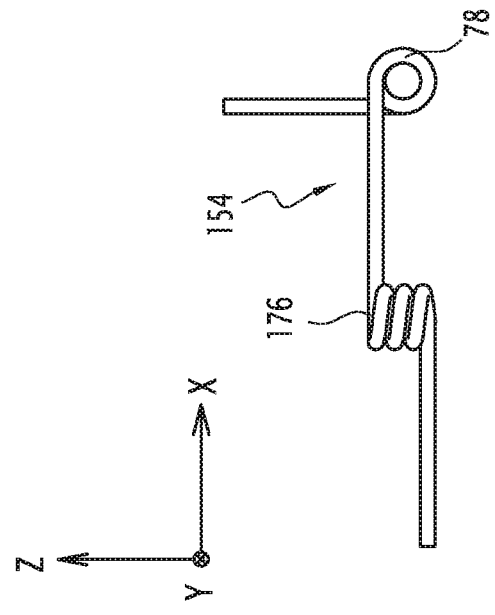
FIG. 2 is a view of one element of the cooler shown in FIG. 1.

FIG. 2 shows a detailed view of the link element 54 which connects the crank pin 40 to the second piston 56.

The link element 54 comprises three adjacent sections 70, 72, 74, the said sections being rigid and substantially rectilinear. A first end 75 of a first section 70 is mounted in a fixed manner on the base 58 of the regeneration piston 56. The first section 70 is substantially aligned with the axis 28 of movement of the piston 56, parallel to X.

A second end of the first section 70 corresponds to a first spring-type link 76, which connects the first section 70 to a second section 72. Like the first section 70, the second section 72 is substantially parallel to X.

One end of the second section 72, which is opposite the first link 76 corresponds to a second spring-type link 78. The second link 78 connects the second section 72 to a third section 74. The third section 74 is disposed to be substantially parallel to Z, that is to say, perpendicular to the second section 72.

One end 80 of the third section 74, which is opposite the second link 78, is mounted in a fixed manner on the head 44 of the connecting rod 42. As can be seen in FIG. 1, the ends 75 and 80 of the link element 54 are disposed on either side of a plane formed by the first axis 22 of the compression piston and the third axis 34 of the crankshaft. In other words, the link element 54 is attached to the connecting rod 42 to be substantially opposite a usual zone of attachment of the connecting rod of the regeneration piston in the devices of the prior art.

In the example shown in FIGS. 1 and 2, the link element 54 is formed of a metal pin wound around itself at the level of the links 76, 78, in a manner so as to form torsion springs at the level of the said links. Each of the said springs 76, 78 is helical, arranged along an axis that is parallel to Y.

Figure 3:
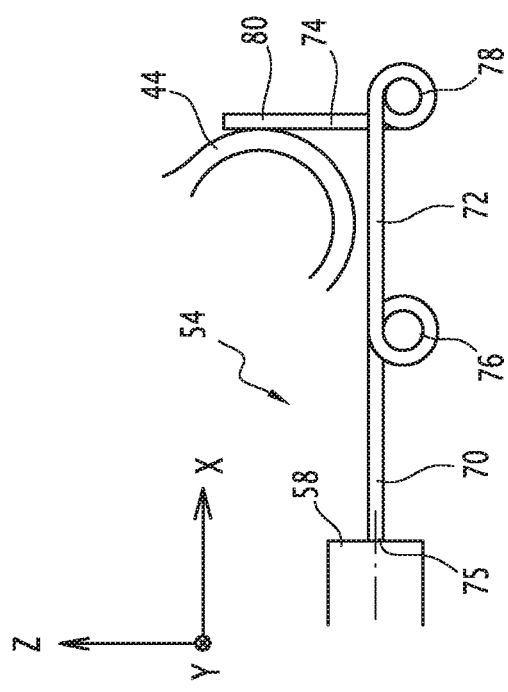
FIGS. 3 to 6 are views of variants of the embodiments of the element shown in FIG. 2.

FIG. 3 shows a variant 154 of the element 54 shown in FIG. 1 and FIG. 2. The element 154 is similar to the element 54 described here above, with the exception of the first link 176 which forms a helical coil spring disposed along an axis that is parallel to Z. The second link 78 is disposed to be parallel to Y, as in the element 54 shown in FIG. 2.

Figure 4:
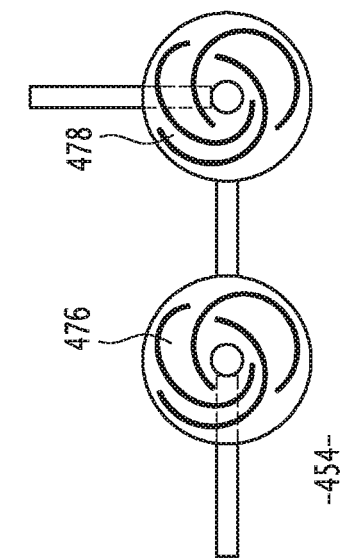
Figure 5:
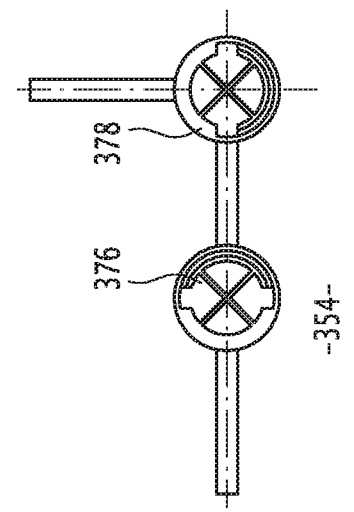
Figure 6:
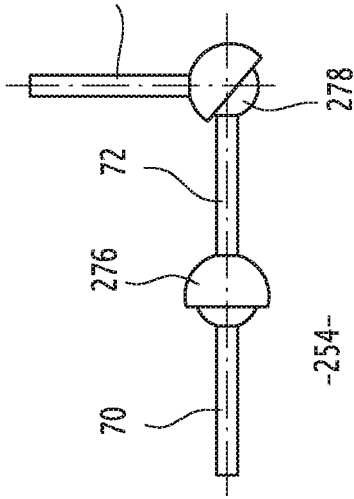

FIGS. 4, 5 and 6 show variants 254, 354 and 454 of the link elements 54 and 154 shown in FIGS. 1, 2 and 3. As in the preceding examples, the elements 254, 354 and 454 comprise of three adjacent sections 70, 72, 74 that are rigid and substantially rectilinear. The two first sections 70, 72 are substantially parallel to X, and the third section 74 is substantially parallel to Z.

The adjacent sections 70, 72 and 72, 74 are respectively connected by the spring-type links. In the example 254 shown in FIG. 4, the links 276, 278 are pivot and/or roller type magnetic bearings. In the example 354 shown in FIG. 5, the links 376, 378 are flex pivots. In the example 454 shown in FIG. 6, the links 476, 478 are flexible bearings.

The elements 154, 254, 354 and 454 described here above are capable of replacing the link element 54 in the device 10 shown in FIG. 1 for a similar operation.

An operating method for operation of the device 10 will now be described, in accordance with the steps of a Stirling cycle that are known as such.

The eccentric crank pin 40 is driven in rotation by the motor shaft of the crankshaft 36, about the axis 34. By means of the connecting rod 42, the rotation of the crank pin 40 is converted into reciprocating rectilinear movement of the compression piston 50, along the first axis 22.

Furthermore, by means of the link element 54, the rotation of the crank pin 40 is converted into reciprocating rectilinear movement of the regeneration piston 56, along the second axis 28.

The spring links 76, 78 ensure the ability of the link element 54 to convert with flexibility the movement of the connecting rod head 44 into rectilinear movement of the piston 56, guided by the regeneration cylinder 26. The spring-type links 76, 78 eliminate the problems linked to a conventional connecting rod-driven drive system, in particular the shock impacts generated by the mechanical clearances.

The movements of the pistons 50, 56 are quasi-sinusoidal. The movements of pistons 50, 56 are out of phase with each other by approximately 90°, that is to say that one of the two pistons 50, 56 is at the mid-point of the stroke when the other of the said two pistons is at one end of its stroke.

For example, it is considered that the compression piston 50 moves along the first axis 22, in the direction towards the flange 24. In the configuration represented in FIG. 1, the compression chamber 52 has almost reached its minimum volume. The helium contained in the said chamber reaches a maximal pressure range and is driven into the regeneration piston 56 through conduit 64, 66. The said regeneration piston is thus then substantially at the mid-point of the stroke in the regeneration cylinder 26 and moves in the direction away from the cold end 30.

The helium passes through the tube 60 of the piston 56 and is cooled upon contact with the heat exchanger contained in the said tube. The regeneration piston 56 continues its stroke in the regeneration cylinder 26 up to a point of maximal expansion of the regeneration chamber 62. Furthermore, the compression piston 50 moves within the compression cylinder 20 in a manner so as to increase the volume of the compression chamber 52, while reducing the pressure of the helium. The return of the regeneration piston 56, combined with the continuing of the expansion of volume of the compression chamber 52, leads the helium to pass through the tube 60 in the opposite direction. The helium then recovers the heat and rises in temperature, before returning into the compression chamber 52 by way of the conduit 64, 66. The compression piston 50 continues its stroke up to a point of maximal expansion of the compression chamber 52, and subsequently heads back in the reverse direction in order to again compress the fluid and complete the cycle.

The distance 38 between the second axis 28 and third axis 34 allows for the movement of the piston 56 in the regeneration cylinder 26 by means of the element 54 without causing the crankshaft 36 to generate any obstruction. It is therefore possible to derive a gain in terms of greater compactness of the cryostat well 16 along the second axis 28.

Preferably, a mounting method for mounting the device 10 is such that when the motor driving the crank pin 40 is not in operation, the spring links 76, 78 are substantially without installed stress. Thus, during the course of operation, the stresses in the links 76, 78 are only induced by the movement of elements of the device 10.

According to one variant of the embodiment that is not represented, the pneumatic connection between the compression chamber 52 and the regeneration chamber 62 is provided by a conduit comprising a deformable tube, disposed within the central space 32. For example, the ends of the tube are connected to inlets in the pistons 50 and 56. The tube is flexible or formed of rigid sections that are connected by flexible zones, in a manner so as to become deformed in accordance with the movements of the pistons 50 and 56.

The invention claimed is:

1. A cooler operating according to a Stirling cycle, comprising:
   a compressor comprising a compression piston that moves within a compression cylinder along a first axis;
   a regenerator comprising a regeneration piston that moves within a regeneration cylinder along a second axis that forms an angle with the first axis;
   a driving crankshaft, comprising a rotatable crank pin, that rotates relative to the compression cylinder and/or the regeneration cylinder, about a third axis that is substantially coplanar to the first axis and substantially perpendicular to the first and second axes; and
   a compression connecting rod, comprising a connecting rod head mounted on said crank pin of said crankshaft and a connecting rod foot that is articulated on said compression piston,
wherein said regeneration piston is connected to said crankshaft by a link element comprising at least a first, a second and a third rigid section, the first and second rigid sections being connected by a first torsion spring, the second and third rigid sections being connected by a second torsion spring, a first end of the link element being fixed on said regeneration piston, and a second end of the link element being fixed on said connecting rod head; wherein the link element is comprised of a metal pin, wound around itself so as to form the first and second torsion springs and the first, the second, and the third rigid sections connected by the first and second torsion springs; wherein each of the first and second torsion springs is formed by a helical coil spring.

2. The cooler according to claim 1, in which the first and second ends of the link element are disposed on either side of a plane formed by the first axis of said compression piston and the third axis of said crankshaft.

3. The cooler according to claim 1, in which the second axis of said regeneration piston is located at a non-zero distance from the third axis of said crankshaft.

4. The cooler according to claim 3, in which the third axis is disposed between the second axis and the compression cylinder.

5. The cooler according to claim 1, in which the at least three rigid sections are substantially rectilinear.

6. The cooler according to claim 5, in which: the first and second sections are disposed to be substantially parallel to the second axis; and the third section is disposed to be substantially parallel to the first axis.

7. The cooler according to claim 1, in which the helical coil springs forming the first and second torsion springs are disposed along axes that are parallel to one another.

8. The cooler according to claim 1, in which the helical coil springs are disposed along axes that are perpendicular to one another.

* * * * *